(12) United States Patent
Oh

(10) Patent No.: US 11,102,447 B2
(45) Date of Patent: Aug. 24, 2021

(54) IMAGE TRANSMISSION APPARATUS FOR MULTI-SCREEN

(71) Applicant: Jae Young Oh, Seoul (KR)

(72) Inventor: Jae Young Oh, Seoul (KR)

( * ) Notice: Subject to any disclaimer, the term of this patent is extended or adjusted under 35 U.S.C. 154(b) by 238 days.

(21) Appl. No.: 16/344,667

(22) PCT Filed: Oct. 23, 2017

(86) PCT No.: PCT/KR2017/011726
§ 371 (c)(1),
(2) Date: Nov. 22, 2019

(87) PCT Pub. No.: WO2018/080123
PCT Pub. Date: May 3, 2018

(65) Prior Publication Data
US 2021/0051293 A1    Feb. 18, 2021

(30) Foreign Application Priority Data
Oct. 25, 2016   (KR) .......................... 10-2016-0138879

(51) Int. Cl.
*H04N 7/10*  (2006.01)
*G06F 3/14*  (2006.01)
*H04N 21/262*  (2011.01)
*H04N 21/43*  (2011.01)
*H04N 21/81*  (2011.01)

(52) U.S. Cl.
CPC .......... *H04N 7/104* (2013.01); *G06F 3/1446* (2013.01); *H04N 21/262* (2013.01); *H04N 21/4307* (2013.01); *H04N 21/8126* (2013.01)

(58) Field of Classification Search
None
See application file for complete search history.

(56) References Cited

U.S. PATENT DOCUMENTS

| 10,334,204 B2* | 6/2019 | Hundemer | H04N 21/262 |
| 2005/0062678 A1* | 3/2005 | Mark | H04N 13/305 345/2.1 |
| 2005/0174482 A1* | 8/2005 | Yamada | H04N 9/3147 348/383 |

(Continued)

FOREIGN PATENT DOCUMENTS

| JP | 2005-244931 A | 9/2005 |
| JP | 2007-183654 A | 7/2007 |

(Continued)

*Primary Examiner* — James R Marandi
(74) *Attorney, Agent, or Firm* — Novick, Kim & Lee, PLLC; Jae Youn Kim

(57) ABSTRACT

An image transmission apparatus for a multi-screen for reducing display timing differences of images displayed on the multi-screen is proposed. To this end, the apparatus is a video transmission apparatus for a multi-screen, including an operating server that generates and transmits an image source according to image scheduling; a router that receives an image from the operating server and transmits the image to a preset IP address; a plurality of client terminals for which IP addresses are respectively set and which receive images corresponding to the IP addresses from the router; and a plurality of display units provided to correspond to the plurality of client terminals and displaying an image transmitted from the respective client terminals on a multi-screen.

6 Claims, 4 Drawing Sheets

(56) References Cited

U.S. PATENT DOCUMENTS

2013/0176539 A1* 7/2013 Kilcher ................ H04N 9/3147
353/10

FOREIGN PATENT DOCUMENTS

| | | |
|---|---|---|
| JP | 2016-009102 A | 1/2016 |
| KR | 10-1998-026792 A | 7/1998 |
| KR | 10-1998-077276 A | 11/1998 |
| KR | 10-2002-0095707 A | 12/2002 |
| KR | 10-2003-0072301 A | 9/2003 |
| KR | 10-2005-0021196 A | 3/2005 |
| KR | 10-2007-0019812 A | 2/2007 |
| KR | 10-0836597 B1 | 6/2008 |
| KR | 10-2009-0041655 A | 4/2009 |
| KR | 10-2015-0141171 A | 12/2015 |
| KR | 10-2016-0054382 A | 5/2016 |
| KR | 10-2016-0116108 A | 10/2016 |

* cited by examiner

IMAGE TRANSMISSION APPARATUS FOR MULTI-SCREEN

TECHNICAL FIELD

The present invention relates to an image transmission apparatus for a multi-screen display, and more specifically, to an image transmission apparatus for a multi-screen display for reducing display timing differences of images displayed on the multi-screen display.

BACKGROUND ART

Most of conventional image transmission apparatuses for a multi-screen display have been operated in a way of displaying multiple split screens to play back images on some of the screens and provide diverse contents such as TV broadcasting and the like on the other screens. However, there is a problem in the speed of downloading the images, as well as the speed of playing back the images, when the conventional multiple split screens like this are displayed, and furthermore, since display timings mismatch among the played back images, there is a problem in displaying an entire screen on the screens different from each other at a high resolution.

DOCUMENTS OF PRIOR TECHNIQUES

Patent Documents (Patent document 1) Korean Patent Laid-open Publication No. 10-2009-0041655 (Title of Invention: Automatic conversion system of image on multi-division screen)

(Patent document 2) Korean Patent Registration No. 10-0507707 (Title of Invention: Network-based advertising/broadcasting scheduling method, and central control management system and method using screen segmentation)

(Patent document 3) Korean Patent Registration No. 10-0732959 (Title of Invention: Apparatus and method splitting TV screen to display broadcasting contents and data service provided through broadcast communication network)

(Patent document 4) Korean Patent Registration No. 10-0201257 (Title of Invention: Apparatus and method for correcting location OSD in video system having multi-division function)

(Patent document 5) Korean Patent Registration No. 10-0247086 (Title of Invention: Apparatus for controlling contrast of video signal by multi-screen division type)

(Patent document 6) Korean Patent Registration No. 10-0247086 (Title of Invention: Device and method for dividing monitor screen into high definition multiple screens of multi-channel input)

(Patent document 7) Korean Patent Registration No. 10-0474211 (Title of Invention: System for monitoring and storing images using plurality of picture division multiplexers)

(Patent document 8) Korean Patent Registration No. 10-0836597 (Title of Invention: Remote controlled image transmitting system capable of the transmission and display of an image while supporting various file formats)

(Patent document 9) Korean Patent Laid-open Publication No. 10-2009-0041655 (Title of Invention: Method and system of generating images for multi-surface display)

DISCLOSURE OF INVENTION

Technical Problem

Therefore, the present invention has been made in view of the above problems, and it is an object of the present invention to provide an invention for adjusting display timings of images displayed on split screens.

The objects of the present invention described above are not limited to the objects mentioned above, and unmentioned other objects may be clearly understood by those skilled in the art from the following descriptions.

Technical Solution

To accomplish the above object, according to one aspect of the present invention, there is provided an image transmission apparatus for a multi-screen display, the apparatus including: an operation server for creating and transmitting an image source according to image scheduling; a router for receiving an image from the operation server and transmitting the image to a preset IP address; a plurality of client terminals, each having an IP address set for the terminal, for receiving an image corresponding to the IP address from the router; and a plurality of display units provided in a one-to-one correspondence relationship with the plurality of client terminals to display images transmitted from the client terminals on the multi-screen display.

In addition, the operation server includes an image source split unit for splitting the image source to correspond to the number of screens of the multi-screen display according to the image scheduling, and transmits the split image sources split by the image source split unit to the plurality of client terminals corresponding to the preset IP addresses through the router, and the plurality of client terminals receives the split image sources and plays back the images on corresponding screens of the multi-screen display on the basis of a playback command of the operation server.

In addition, the split sources are split to express different parts of an entire screen expressed by the multi-screen display, and transmitted to the plurality of client terminals.

In addition, the operation server further includes an image scheduling unit for creating a schedule of an image and a message, and the image schedule is a setting related to split of the sources and insertion of an event message and a notification message corresponding to a playback sequence and a playback time of the plurality of client terminal and the number of screens of the multi-screen display.

In addition, the operation server further includes a screen position adjustment unit for transmitting, when an image displayed on a screen of the multi-screen display is distorted with respect to a coordinate axis, a signal for correcting the distortion to the client terminal.

In addition, the operation server further includes a control unit for dividing a control area into groups by grouping the plurality of client terminals according to the number of screens of the multi-screen display, and the control unit divides the control area into an image control group and a message control group according to the grouping and transmits a control signal related to image control to the image control group and a control signal related to message control to the message control group.

In addition, the operation server further includes an image timing adjustment unit for adjusting a time difference of the images displayed on the multi-screen display to synchronize the played back images with each other to prevent occurrence of a delay, and each of the client terminals includes an image timing check unit for checking occurrence of a timing and transmitting a result to the operation server, when the operation server requests to check an image timing.

In addition, the image timing check unit checks an image timing at a specific frame position set in advance and sends a timing check notification to the image timing adjustment unit, wherein the specific frame position is a position corresponding to a preset frame length or a position corresponding to a preset frame playback time, and the image timing adjustment unit receives the check notification from each client terminal, senses occurrence of a timing in a specific client terminal by comparing the check notification with an original image source, and transmits a timing adjustment signal for adjusting the image timing to a corresponding client terminal.

In addition, the image source split unit inserts a timing check bit into each split source, and the image timing check unit recognizes the timing check bit and sends a timing check notification to the image timing adjustment unit, and the image adjustment unit receives the check notification from each client terminal, senses occurrence of a timing in a specific client terminal by comparing the check notification with an original image source, and transmits a timing adjustment signal for adjusting the image timing to a corresponding client terminal.

In addition, the image timing check unit senses a position of a currently played back frame and playback information and sends a timing check notification to the image timing adjustment unit when the operation server requests to check an image timing, and the image timing adjustment unit receives the check notification from each client terminal, senses occurrence of a timing in a specific client terminal by comparing the check notification with an original image source, and transmits a timing adjustment signal for adjusting the image timing to a corresponding client terminal.

Advantageous Effects

According to the present invention as described above, there is an effect of adjusting image display timing of split screens and drastically reducing the transmission time by transmitting split sources from an operation server to client terminals.

BRIEF DESCRIPTION OF THE DRAWINGS

Since the drawings attached in this specification exemplify preferred embodiments of the present invention for further understanding the spirits of the present invention, together with the detailed description of the present invention, the present invention should not be interpreted to be limited to the disclosure shown in the drawings.

DESCRIPTION OF SYMBOLS

Figure 1:
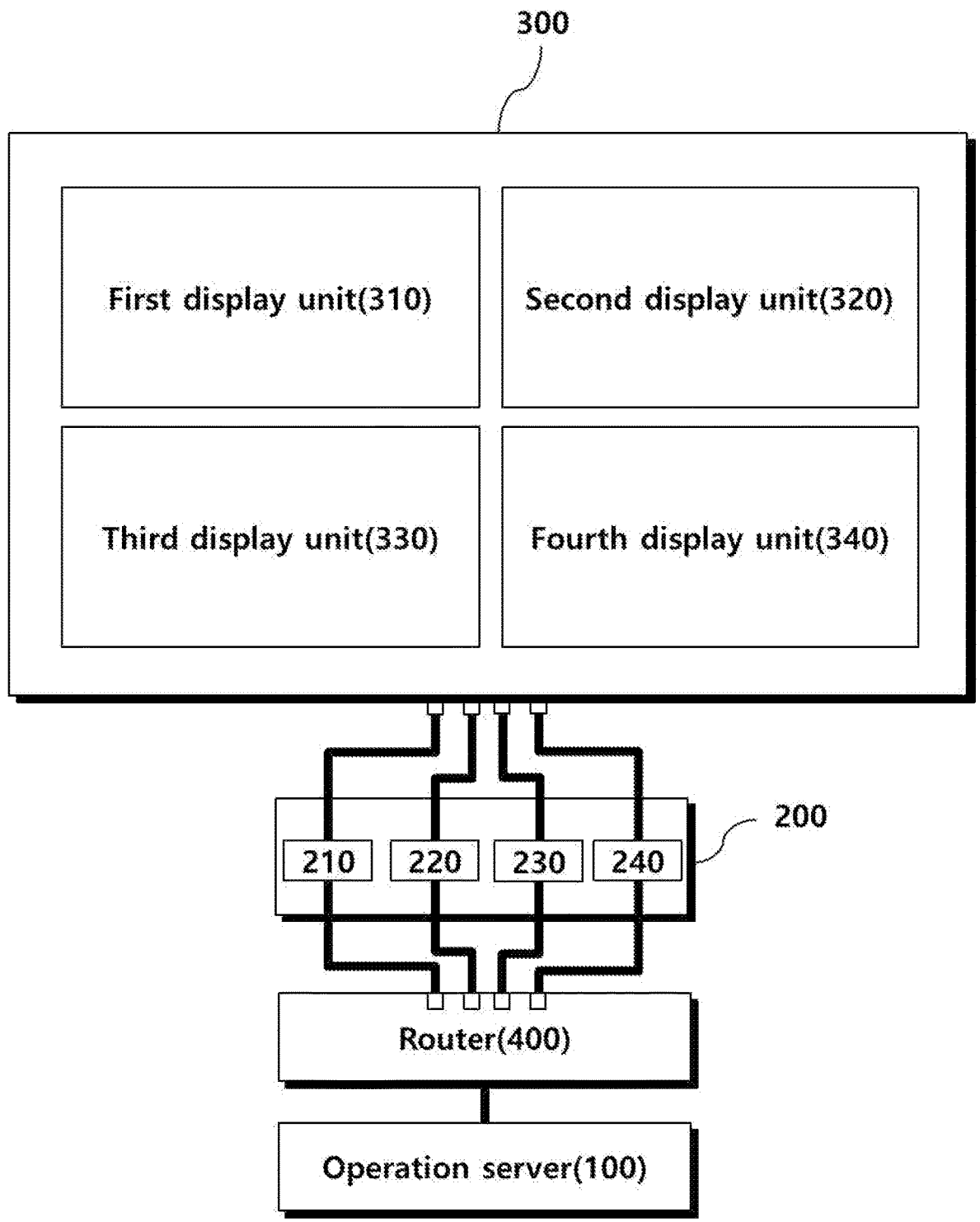
FIG. 1 is a view showing client terminals belonging to the same group according to an embodiment of the present invention.

10: Image frame
100: Operation server
110: Authentication unit
120: Operation setting unit
130: Image source split unit
140: Image scheduling unit
150: Screen position adjustment unit
160: Image timing adjustment unit
170: Control unit
180: Communication unit
190: Storage unit
200: Client terminal
210: First client terminal
211: Log record creation unit
212: Operation setting unit
213: Image timing check unit
214: Control unit
215: Communication unit
216: Storage unit
220: Second client terminal
230: Third client terminal
240: Fourth client terminal
300: Display unit
310: First display unit
320: Second display unit
330: Third display unit
340: Fourth display unit
400: Router

BEST MODE FOR CARRYING OUT THE INVENTION

Hereinafter, a preferred embodiment of the present invention will be described with reference to the accompanying drawings. In addition, the embodiment described below does not unduly limit the content of the present invention disclosed in the claims, and the entire configuration described in this embodiment is not regarded as an essential solution of the present invention. In addition, conventional techniques and descriptions on the elements (methods) that are apparent to those skilled in the art may be omitted, and descriptions on the omitted elements (methods) and functions may be sufficiently referenced without departing from the spirit of the present invention.

An image transmission apparatus for a multi-screen display according to an embodiment of the present invention is an invention implementing high-resolution images through the multi-screen display. Hereinafter, the configuration and functions of the image transmission apparatus for a multi-screen display according to an embodiment of the present invention will be described with reference to the accompanying drawings.

Figure 2:
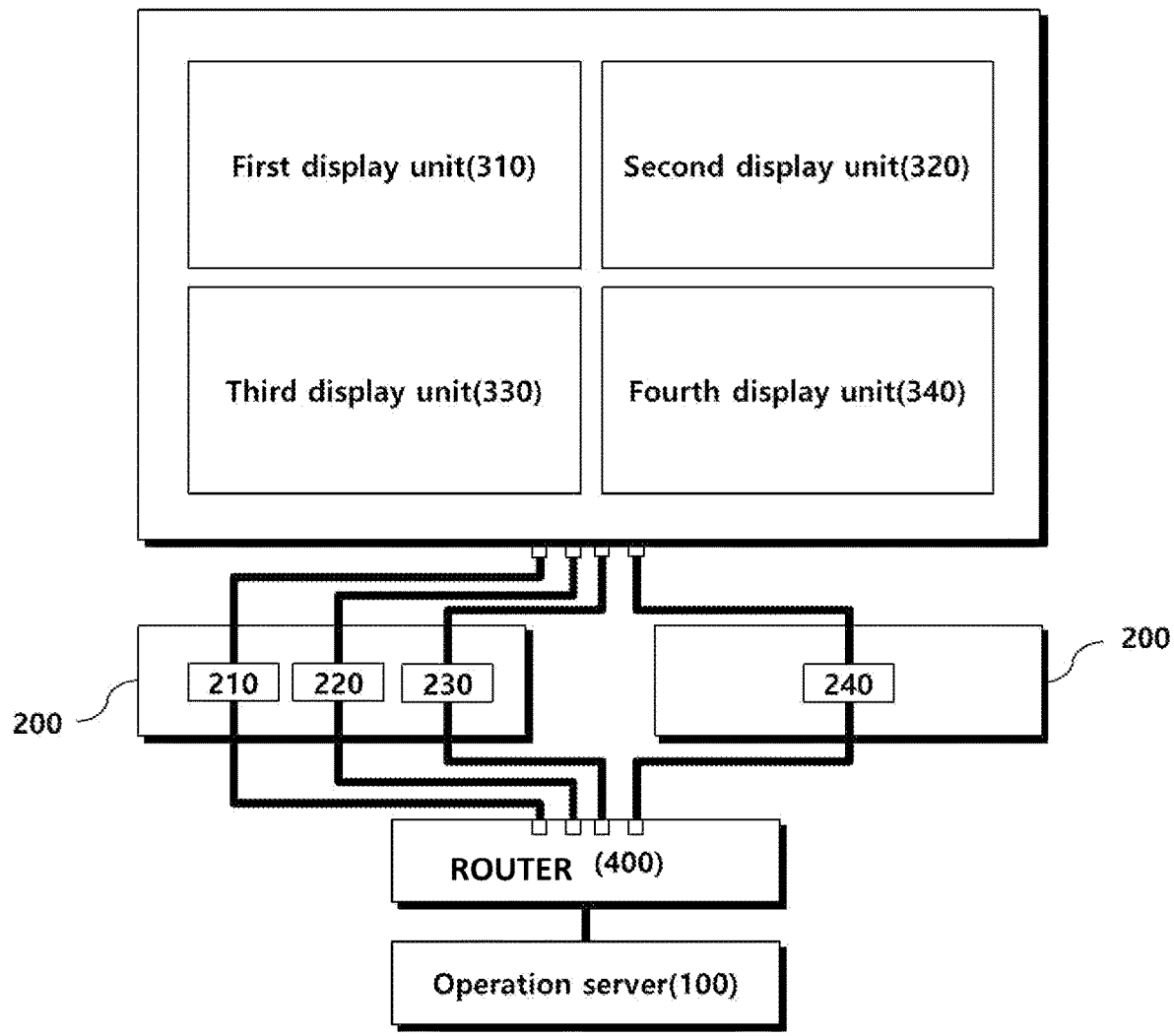
FIG. 2 is a view showing client terminals belonging to different groups according to an embodiment of the present invention.
Figure 3:
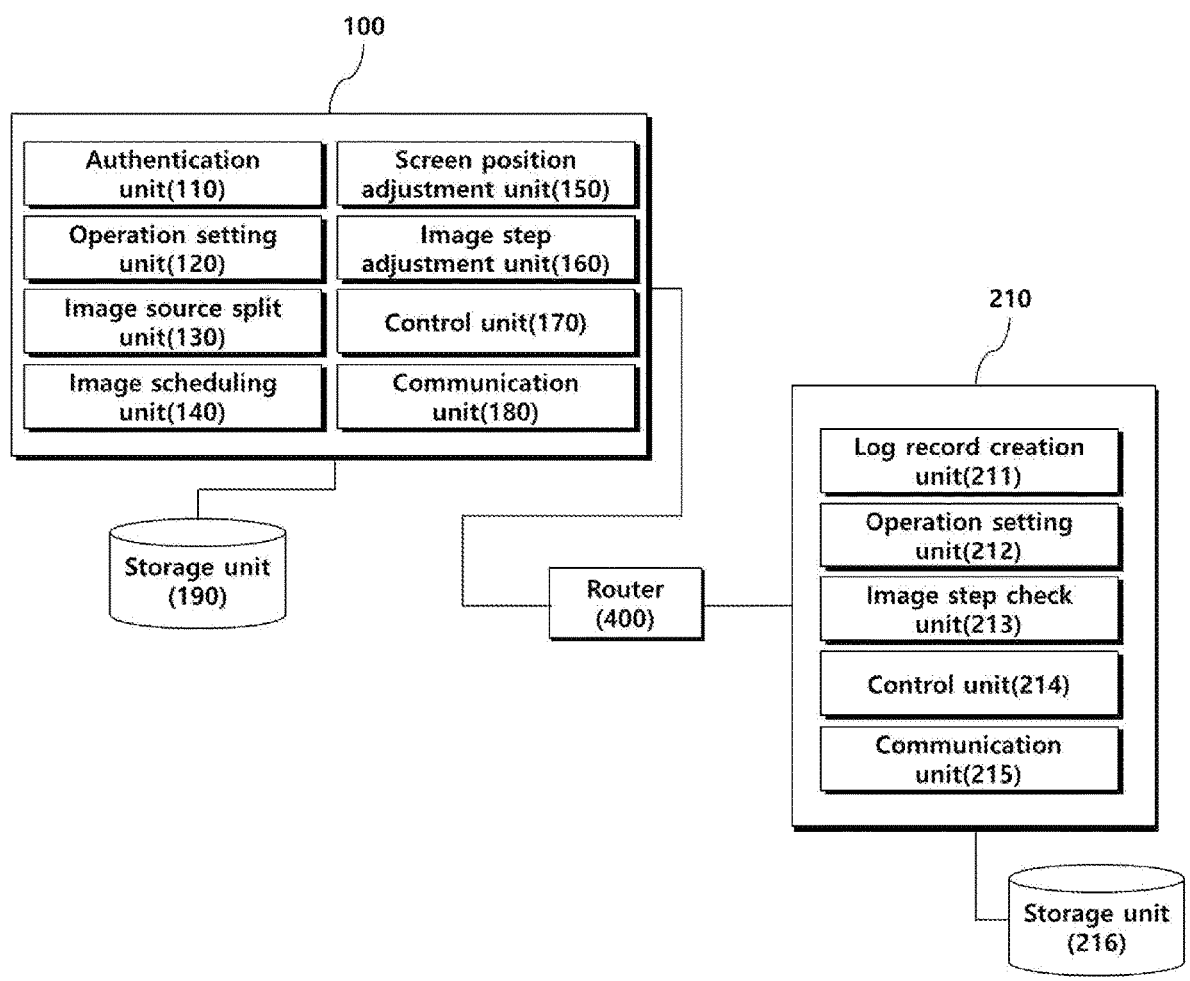
FIG. 3 is a view showing the configuration an image transmission apparatus for a multi-screen display according to an embodiment of the present invention.

As shown in FIGS. 1 to 3, the image transmission apparatus for a multi-screen display according to an embodiment of the present invention may be largely configured of an operation server 100, a plurality of client terminals 200, a display unit 300 implementing the multi-screen display, and a router 400 and may further include additional elementary techniques as needed.

The operation server 100 is tied to a network together with the router 400 and the client terminal 200 and may transmit or receive data with each other. In addition, the client terminal 200 is interconnected with the display unit 300 through a network or a connection cable such as an HDMI cable or the like. An operation program for controlling and operating the client terminal 200 is installed in the operation server 100, and hereinafter, the operation program will be described by dividing the configuration and functions of the operation program.

An authentication unit 110 registers licenses of the first, second, third and fourth client terminals 210, 220, 230 and 240. Accordingly, when a client terminal who has not registered an authenticated license is connected, the client terminal may not exchange data with the operation server 100. That is, only the client terminals who have registered the license may operate in connection with the operation server 100.

An operation setting unit 120 sets a network ID address of the operation server 100. The ID address set at this point is preferably set to be different from the ID addresses of the first, second, third and fourth client terminals 210, 220, 230 and 240. In addition, the operation setting unit 120 controls image playback of the client terminals 210, 220, 230 and 240 by setting start, stop and pause of playback, skip of frames in a playback image, and the like. Each of the client terminals 210, 220, 230 and 240 operates according to the playback control of the operation setting unit 120. For example, the operation setting unit 120 may set to pause an image of the first terminal 210 and to play back images of the other terminals 220, 230 and 240. Meanwhile, the operation setting unit 120 may insert a new image in a playback list by inserting the new image while the current image is played back. The inserted new image is played back according to scheduling of an image scheduling unit described below.

An image source split unit 130 creates as many source images as the number of multiple screens by splitting an original image. Referring to FIG. 1, the multi-screen display is split into four screens in total, and the terminals 210, 220, 230 and 240 are provided to correspond to the four split screens of the multi-screen display, respectively. In addition, different part of the entire screen is expressed on each of the multiple screens. Accordingly, the left upper image of the entire image is displayed on a first display unit 310, the right upper image of the entire image is displayed on a second display unit 320, the left lower image of the entire image is displayed on a third display unit 330, and the right lower image of the entire image is displayed on a fourth display unit 340. The entire screen may be displayed at a high resolution owing to the multiple split screens. Accordingly, an image source is created for each of the split images to correspond to the left upper image, the right upper image, the left lower image, or the right lower image. The image sources created by splitting like this are transmitted to corresponding terminals 210, 220, 230 and 240 respectively and displayed on the multiple split screens.

An image scheduling unit 140 sets a playback sequence and a playback time of an image. For example, the image scheduling unit 140 sets a playback sequence or a playback time of an image of each terminal 210, 220, 230 and 240 so that the image may be played back at the set time. In addition, the image scheduling unit 140 sets to split a source according to the number of multiple split screens. That is, split image sources corresponding to the number of multiple split screens are created. In addition, the image scheduling unit 140 may schedule to display an event message or image or a notification message. The image scheduling unit 140 may schedule to display an event message, an event image or a notification message in a special case, in addition to scheduling display of a playback image on the multi-screen display. That is, describing with reference to FIGS. 1 and 2, generally, a high resolution image is played back by displaying an image on the multiple split screens as shown in FIG. 1. In an urgent or special case, any one of the multiple screens displays an emergency message or an event image as shown in FIG. 2, rather than displaying an image source the same as those of the other multiple screens. That is, in FIG. 2, the first, second and third terminals are connected to the first, second and third display units to display split images on the multiple split screens, and the fourth terminal is connected to the fourth display unit to display an emergency message or an event image. However, the embodiment described above is only an example, and the screen for displaying an emergency message or an event image may be changed. The event image may be a public relation image or a product event image (description on a product, a sale price, guidance of a purchase period or the like) of a product related to the image currently displayed through the multiple screens. In addition, the emergency message may be a message generated when an urgent situation, such as a disaster or a fire, currently occurs in a facility or an emergency message transmitted from a broadcasting station.

A screen position adjustment unit 150 sets to change display positions of the images and the messages displayed on the first, second, third and fourth display units 310, 320, 330 and 340. For example, it may be set to display an image that is displayed on the first display unit 310 on the fourth display unit 340. In this case, split images should be retransmitted to the terminals according to change of the display position set by the screen position adjustment unit 150. In addition, when an image displayed on a display unit is distorted with respect to the coordinate axis (when the image does not correctly fit to the screen), the screen position adjustment unit 150 transmits a signal for correcting the distortion to each terminal (a terminal connected to the display unit which needs image correction) to correct the position of the screen. The correction signal moves the coordinate axis of the screen toward the center as much as (X, Y).

The control unit 170 uploads the images split by the image source split unit 130 on the terminals, individually or altogether. However, the image source split may be accomplished in a way of actually creating split source files by splitting a source, or an image fit to each display unit may be split and stored by each terminal as soon as the entire image file is transmitted to the terminal. In FIG. 1, all the terminals are grouped in one group, and in FIG. 2, the first, second and third terminals are grouped in a first group, and the fourth terminal is classified as a second group. Accordingly, the control unit 170 may separately control the first group and the second group. That is, the terminals included in the first group and the terminal included in the second group may be separately controlled. As the terminals are controlled in groups like this, occupancy in using a network may be lowered, and when a large number of multiple split screens are provided (for example, two hundred multiple split screens), efficiency of control may be enhanced by controlling the terminals in groups. The terminals are grouped into a group in which playback of split images is needed (the first, second and third terminals of FIG. 2) and a group in which an emergency message or an event image is played back (the fourth terminal of FIG. 2). The grouping like this is an example, and a group which plays back split images may be grouped in further detail as needed. In addition, the control unit 170 is organically connected to the configurations described above and the configuration described below to operate the entire program.

Meanwhile, the control unit 170 may control the client terminals 200 individually or in groups as described above through virtual network computing (VNC). The control unit 170 may check and monitor the state of each terminal in real-time through VNC. The control unit 170 may transmit a control command only to a corresponding group in the case of group control, and each terminal may execute the control command of the control unit 170 only when the terminal belongs to the group. In addition, the control unit 170 may control to turn on and off the power of each terminal through VNC.

In addition, the control unit 170 may control various kinds of lighting devices and mood lamps installed outside through the communication unit 180. At this point, the control unit 170 controls the lighting devices or the mood lamps in synchronization with the image or the message contents displayed through each terminal. Although RS-232C communication is preferred, other wired or wireless communication methods may be used as needed.

The communication unit 180 facilitates smooth exchange of data with external devices. That is, the communication unit 180 is connected to the client terminal 200 through an Internet network and exchanges data with the client terminal 200. In addition, the communication unit 180 may be provided with a Bluetooth module, a Wi-Fi module or the like to wirelessly connect to other external devices. In addition, the communication unit 180 may use RS-232c, RS-422 or RS-485 interfaces as a wired communication method.

The storage unit 190 stores various kinds of data and stores images and contents desired to play back. In addition, the storage unit 190 stores the ID and license of each terminal and stores split images.

An image timing adjustment unit 160 adjusts an image displayed on each split screen so that the image may be displayed without a time difference or a delay. That is, in the case of four split screens as shown in FIG. 1, the screens express different parts of an image so that the whole image may be displayed on the screens at a high resolution. Accordingly, if the different parts of the image are synchronized with each other, a timing does not occur. To this end, the image timing adjustment unit 160 may sense occurrence of a timing by continuously monitoring the state of each terminal or each terminal may periodically check its own timing status and transmit the timing status to the image timing adjustment unit 160 to prevent occurrence of the timing.

Figure 4:
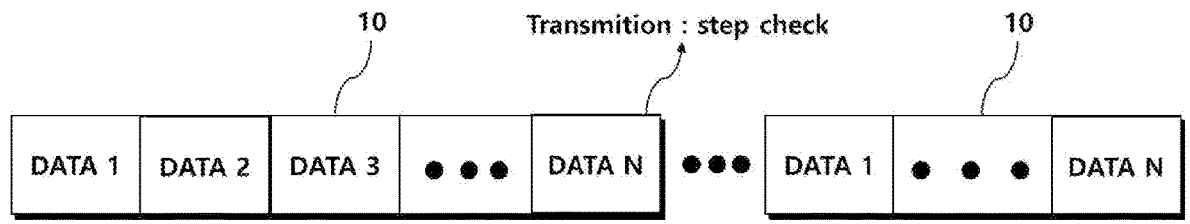
FIG. 4 is a view showing a timing check notification message transmitted on DATA N according to an embodiment of the present invention.

Describing, for example, a case of assuming that the first terminal 210 plays back an image frame 10, the first terminal 210 plays back the image frame 10 as shown in FIG. 4. At this point, if a specific point of the image frame 10 is reached, an image timing check unit 213 recognizes arrival at the specific point and sends a timing check notification to the image timing adjustment unit 160. At this point, the terminals playing back the split images, other than the first terminal, also send a timing check notification. The image timing adjustment unit 160 receiving the image timing check notification from the terminals may calculate a timing of each terminal by calculating an "arrival time of the check notification" transmitted from each terminal or recognizing an "image frame playback position" of each terminal included in the check notification (the timing of a terminal may be calculated by comparing the image frame with the original image). Accordingly, an ID of each terminal, a playback frame position of a current image, a message transmission time and the like may be included in the check notification. An accurate timing of each terminal may be obtained by calculating a transmission time and an arrival time of the message at the operation server.

Meanwhile, when the image timing check unit 213 transmits the image timing check notification to the operation server, it may be when a specific frame point is reached or a preset frame playback time is elapsed. That is, the check notification may be sent at a playback time point of "DATA N (in this case, the check notification is sent when a frame length is set in advance and the preset frame length is reached)" set in advance as shown in FIG. 4. In addition, if the operation server 100 transmits a control command so that each terminal may begin playback of an image, each terminal may begin playback of the image and send a check notification after a preset playback time is elapsed. At this point, the preset playback time may be set to "five seconds" to periodically send the check notification to the operation server. However, the playback time may be set to a value other than "five seconds" depending on situation.

Figure 5:
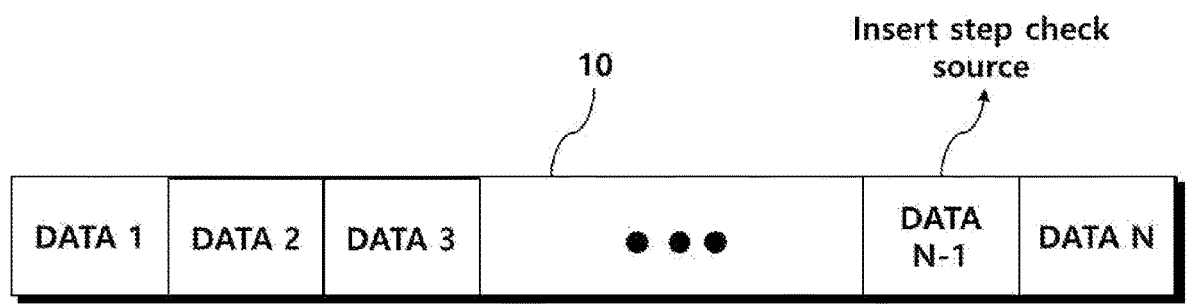
FIG. 5 is a view showing a timing check bit inserted in DATA N-1 according to an embodiment of the present invention.

As another example, as shown in FIG. 5, a timing check bit is inserted in each split source (at the position of DATA N-1) when the image source split unit 130 splits an image, and the image timing check unit 213 continuously senses playback of the image frame 10 and transmits a timing check notification to the operation server when the timing check bit is sensed. The image timing adjustment unit 160 receives the check notification from each client terminal and senses occurrence of a timing in a specific client terminal by comparing the check notification with an original image source or a split image source. That is, the operation server may also play back an original image or a split image at the same time as beginning of playback of each terminal (although it does not actually play back the image, a current playback time point may be known by playing the original image or the split image in accordance with the beginning of playback of the split image of each terminal), and accordingly, the position of an image frame to currently play back may be known, and a timing may be calculated. The operation server transmits a timing adjustment signal for adjusting the timing to the terminal where the timing is generated so that all the split images may be displayed in synchronization with each other.

As the final example, when the operation server requests to check an image timing, the image timing check unit 213 senses a position of a currently played back frame and playback information and sends a timing check notification to image timing adjustment unit, and the operation server may calculate a timing of each terminal. The timing calculation is as described above. At this point, the playback information may be a "frame number", a "terminal ID", a "data", a "time of transmitting to the operation server", a "time of receiving a timing check request" or the like of a played back frame.

If the image timing check unit 213 sends a timing check notification to the image timing adjustment unit 160 by the three examples as described above, the image timing adjustment unit 160 calculates a timing of each terminal and sends a timing adjustment signal to a terminal in which the timing exceeds a preset range so that the image may be synchronized among the terminals and displayed without a delay. The timing adjustment signal may be a "terminal ID" or a "timing adjustment time".

The operation server 100 may be divided into a master server and a slave server, and the master server and the slave server are connected to each other through a network. As the master server and the slave server are provided like this, about five hundred or more multiple split screens may be configured to display an image on the five hundred split screens synchronized with each other.

The client terminal 200 may be configured of, for example, four terminals as shown in FIG. 1, and each of the terminals is connected to a corresponding display unit 310, 320, 330 or 340, and each of the display units displays a predetermined split image. An operation program is also installed in each terminal 200 and connected to the operation program of the operation server and controls images and messages. Hereinafter, although the first terminal 210 is described as an example, this will be equally applied to the other terminals.

A different network ID address is set for each terminal by an operation setting unit 212, and as the ID of each terminal is registered in the operation server and authenticated by an authentication unit 110, they operate with each other. A storage unit 216 stores the split images uploaded from the operation server, and at this point, when an image is deleted from the operation server, an image of a corresponding terminal is also deleted automatically. A log record creation unit 211 stores log records in the storage unit 216 and confirms an error or a fault on the basis of the log records. A communication unit 215 is provided with a communication module corresponding to the communication unit of the operation server described above. In addition, an HDMI module or a module allowing Internet may be provided to be connected to the first display unit 310. A control unit 214 is organically connected to each of the components described above and performs overall operation thereof.

As shown in FIG. 2, it may be set to display the split images on the first, second and third terminal 210, 220 and 230 and to display contents (an event image or an emergency message) on the fourth terminal 240. The contents may be a (paid or free) banner advertisement, advertisements of displayed products, an emergency message, a notification message, an announcement of an organizer, or an emergency broadcast. The contents are displayed on the fourth display 340, and the contents described above may be split and displayed on the fourth display 340 together, or the operation server may change the control group so that the third and fourth terminals may display the contents. Accordingly, the display units 310, 320, 330 and 340 may simultaneously display a contents screen and an image screen. The contents may additionally include an installation location, today's date, current time and the like. In addition, the display unit may receive TV images from broadcasting stations and display the TV images. In addition, the contents may include a Power Point File format/extension (PPT) for "PPT" presentation.

The display unit 300 is configured of four multiple split screens as shown in FIGS. 1 and 2, and each of the display units is connected to a corresponding terminal. The number of the multiple split screens may be changed according to installation environments, and the terminals are provided in correspondence thereto.

The router 400 receives a message from the operation server 100 and transmits the message to each designated IP address.

The configurations and functions of the units are separately described for the convenience of explanation, and any one of the configurations and functions may be implemented to be integrated with other configurations or to be subdivided in further detail.

Although it has been described with reference to an embodiment of the present invention, the present invention is not limited thereto, and diverse modifications and applications are possible. That is, those skilled in the art may easily understand that many modifications can be made without departing from the gist of the present invention. In addition, it should be noted that if detailed description on already known functions related to the present invention and constitutions thereof or combined relation of the constitutions may unnecessarily make the spirit of the present invention unclear, the detailed description thereof are omitted.

The invention claimed is:

1. An image transmission apparatus for a multi-screen display, the apparatus comprising:
an operation server for creating and transmitting image sources according to image scheduling;
a router for receiving an image from the operation server and transmitting the image to a preset IP address;
a plurality of client terminals, each having an IP address set for the terminal, for receiving an image corresponding to the IP address from the router; and
a plurality of display units provided in a one-to-one correspondence relationship with the plurality of client terminals to display images transmitted from the client terminals on the multi-screen display, wherein
the operation server includes an image source split processor for splitting the image sources to correspond to the number of screens of the multi-screen display according to the image scheduling, and an image scheduling processor for creating a schedule of an image and a message, and transmits the split image sources split by the image source split processor to the plurality of client terminals corresponding to the preset IP addresses through the router, and the plurality of client terminals receives the split image sources and plays back the images on corresponding screens of the multi-screen display on the basis of a playback command of the operation server, and the image schedule is a setting related to split of the sources and insertion of an event message and a notification message corresponding to a playback sequence and a playback time of the plurality of client terminals and the number of screens of the multi-screen display,
wherein the operation server further includes a screen position adjustment processor for transmitting, when an image displayed on a screen of the multi-screen display is distorted with respect to a coordinate axis, a signal for correcting the distortion to one of the client terminals, and
wherein the operation server further includes a control processor for dividing a control area into groups by grouping the plurality of client terminals according to the number of screens of the multi-screen display, and the control processor divides the control area into an image control group and a message control group according to the grouping and transmits a control signal related to image control to the image control group and a control signal related to message control to the message control group.

2. The apparatus according to claim 1, wherein the split sources are split to express different parts of an entire screen expressed by the multi-screen display, and transmitted to the plurality of client terminals.

3. The apparatus according to claim 1, wherein the operation server further includes an image timing adjustment processor for adjusting a time difference of the images displayed on the multi-screen display to synchronize the played back images with each other to prevent occurrence of a delay, and each of the client terminals includes an image timing check processor for checking occurrence of an timing difference and transmitting a result to the operation server, when the operation server requests to check the image timing difference.

4. The apparatus according to claim 3, wherein the image timing check processor checks an image timing at a specific frame position set in advance and sends a timing check notification to the image timing adjustment processor, wherein the specific frame position is a position corresponding to a preset frame length or a position corresponding to a preset frame playback time, and the image timing adjustment processor receives the check notification from each client terminal, senses occurrence of the timing difference in a specific client terminal by comparing the check notification with an original image source, and transmits a timing adjustment signal for adjusting the image timing to a corresponding client terminal.

5. The apparatus according to claim 3, wherein the image source split processor inserts a timing check bit into each split source, and the image timing check processor recognizes the timing check bit and sends a timing check notification to the image timing adjustment processor, and the image timing adjustment processor receives the check notification from each client terminal, senses occurrence of the timing difference in a specific client terminal by comparing the check notification with an original image source, and transmits a timing adjustment signal for adjusting the image timing to a corresponding client terminal.

6. The apparatus according to claim 3, wherein the image timing check processor senses a position of a currently played back frame and playback information and sends a timing check notification to the image timing adjustment processor when the operation server requests to check an image timing, and the image timing adjustment processor receives the check notification from each client terminal, senses occurrence of the timing difference in a specific client terminal by comparing the check notification with an original image source, and transmits a timing adjustment signal for adjusting the image timing to a corresponding client terminal.

\* \* \* \* \*